3,769,263
VINYL HALIDE POLYMERS STABILIZED WITH
TWO ORGANOTIN COMPOUNDS
William E. Mayo, Lunenburg, Mass., and Joel B. Gottlieb, Edison, N.J., assignors to M & T Chemicals Inc., Greenwich, Conn.
No Drawing. Continuation-in-part of abandoned application Ser. No. 680,444, Nov. 2, 1967. This application May 12, 1971, Ser. No. 142,750
The portion of the term of the patent subsequent to Jan. 28, 1985, has been disclaimed
Int. Cl. C08f 45/62
U.S. Cl. 260—45.75 K
6 Claims

ABSTRACT OF THE DISCLOSURE

This invention relates to improved two-component stabilizers comprising a compound of the formula $(RSnX_{1.5})_n$ in combination with a compound of the formula $R'_2SnSR''_2$ and to halogen-containing vinyl resin compositions stabilized against the deteriorative effect of heat, said resin compositions containing effective amounts of the improved two component stabilizer. R is a monovalent alkyl hydrocarbon radical containing between 1 and 4 carbon atoms, inclusive; R' is a monovalent alkyl hydrocarbon radical containing between 1 and 12 carbon atoms, inclusive; R'' is the residue of a carboxylic acid ester, a benzyl radical or a hydrocarbon radical selected from the same group as R', X represents sulfur or specified oxygen-sulfur mixtures and $n$ is an integer between about 2 and 5.

---

This application is a continuation-in-part of application Ser. No. 680,444, filed Nov. 2, 1967 and now abandoned.

This invention relates to a method for stabilizing halogen-containing vinyl polymers including poly(vinyl chloride) and to novel stabilized halogen-containing polymer compositions.

As is well known to those skilled-in-the- art, various halogen-containing organic polymers, particularly vinyl halide polymers which include homopolymers of vinyl chloride and copolymers of vinyl chloride with other monomerss, often degrade when subjected to heat over an extended period of time as evidenced by darkening of the resin and by an increase in brittleness. These defects may render the resin unsuitable for many uses since the darkening produces an unsightly appearance, and the increased brittleness may cause mechanical failures. A wide variety of materials has heretofore been employed to stabilize halogen-containing polymers. Many of these additives have achieved some measure of success in stabilizing halogen-containing resins against the degradative action of heat, but there are many applications in which a greater degree of heat stability is desired than has heretofore been readily attainable.

It is particularly characteristic of prior art stabilizing systems that they may not fully prevent the deterioration of resins or polymers including poly(vinyl chloride) during the period when the resins and stabilizer composition may be maintained on the hot mill on which they are blended. During this period, which may be from 5 to 30 minutes or longer, the various ingredients including e.g. pigment, plasticizer, stabilizer, lubricant, etc. may be mixed with the resin and the mixture subjected to the influence of heat and pressure to form a substantially homogeneous mixture. During this period of severe heating (typically at 175° C. or higher), the resin may deteriorate much more quickly than under normal processing or handling conditions. Thus the product coming from the Banbury Mill-Blender or extruder may be darker than is desirable.

Those skilled-in-the-art have heretofore attempted to eliminate this deterioration resulting from heat by addition of various materials including auxiliary heat stabilizers. It has been found, however, that the presence of these additional materials results in undesirable side effects which may unsatisfactorily modify the desired properties of the resin or polymer. Accordingly, it has heretofore not been possible to prepare resin compositions which may be stabilized in a totally satisfactory manner against the deteriorative effect of heat.

It is an object of this invention to provide a method for stabilizing halogen-containing vinyl polymer or resin compositions, particularly vinyl halide polymers, against heat deterioration. It is a further object of this invention to provide novel stabilized halogen-containing polymers. Other objects will be apparent to those skilled-in-the art from inspection of the following description.

SUMMARY OF THE INVENTION

In accordance with one of its aspects, this invention concerns an improved halogen-containing vinyl resin composition stabilized against the deteriorative effect of heat wherein the stabilizer comprises effective amounts of: a first stabilizer having the formula $(RSnX_{1.5})_n$ wherein R is a monovalent alkyl hydrocarbon radical containing between 1 and 4 carbon atoms, X is selected from the group consisting of sulfur and mixtures of 1–10 parts of oxygen with 10–1 parts of sulfur and $n$ is an integer between about 2 and 5, inclusive; and a second stabilizer $R'_2Sn(SR'')_2$ wherein R' is a monovalent alkyl hydrocarbon radical containing between 1 and 12 carbon atoms; R'' is the residue of an ester derived from acetic or propionic acid and a monohydric alcohol containing between 5 and 16 carbon atoms, benzyl radical or a radical selected from the same group as R'.

A second aspect of this invention concerns improved compositions for stabilizing halogen-containing vinyl resins against the deteriorative effect of heat, said compositions comprising a first stabilizer of the formula $(RSnX_{1.5})_n$ and a second stabilizer $R'_2Sn(SR'')_2$, wherein R, R', R'', X and $n$ are as defined hereinbefore.

DETAILED DESCRIPTION OF THE INVENTION

The polymers or resins which are stabilized by practice of this invention include halogen-containing vinyl polymers, typically those which contain chlorine atoms bonded to the polymer chain. These polymers may be homopolymers including poly(vinyl chloride) type polymers, e.g. poly(vinyl chloride), poly(vinylidene chloride), or copolymers formed by the copolymerization of vinyl chloride or vinylidene chloride with other ethylenically unsaturated monomers. The ethylenically unsaturated monomers include compounds which contain polymerizable carbon-to-carbon double bonds, e.g. acrylates such as acrylic acid, ethyl acrylate, acrylonitrile, etc.; vinyl monomers such as styrene, vinyl acetate, etc.; maleates such as maleic acid, maleic anhydride, maleate esters, etc. For convenience, reference will hereinafter be made to vinyl chloride polymers.

The polymers may be either "rigid" or "flexible." When "rigid" polymers are employed, they may include impact modifiers, pigments and/or fillers, lubricants, etc. in addition to the resin and stabilizer. When "flexible" polymers are employed, they may include plasticizer (primary and secondary), pigments and/or fillers, lubricants, etc. in addition to the resin and stabilizer.

The vinyl chloride polymers may also contain plasticizers such as dioctyl phthalate; lubricating agents such as stearic acid; pigments; fillers; etc.

The compounds which comprise one member of the stabilizer pairs of this invention are referred to as polymeric alkyl thiostannonic (or thiostannoic) anhydrides and chemically combined mixtures of polymeric alkyl thiostannoic anhydrides with polymeric alkyl stannonic (or stannoic) anhydrides. For convenience the terms thiostannoic and stannoic will be employed. These polymeric anhydrides include compounds formed by dehydration and/or condensation of thiostannoic acids or a mixture of stannoic and thiostannoic acids. The average degree of polymerization, represented by $n$ in the preceding formulae, is between about 2 and 100, preferably between 2 and 5. In the co-condensation products of this invention, units of a stannoic anhydride may alternate with units of a thiostannoic anhydride, in which instance the degree of polymerization for each species is between about 2 and 5.

The alkyl thiostannoic anhydrides of this invention may be prepared by reacting the corresponding monoalkyltin trihalide, e.g. butyltin trichloride, with a suitable inorganic sulfide, e.g. sodium sulfide. Using butyltin trichloride the product is believed to correspond to the formula $(C_4H_9SnS_{1.5})_n$, wherein $n$ is defined hereinbefore. If the monoalkyltin trihalide is reacted in an aqueous medium with less than the equivalent amount of inorganic sulfide the product is believed to comprise a mixture of the corresponding stannoic and thiostannoic anhydrides, as represented by the formula $(RSnO_{1.5})_m(RSnS_{1.5})_n$ wherein $m$ is an integer selected from the same group as $n$.

Preferred first stabilizers include methyl thiostannoic anhydride $(CH_3SnS_{1.5})_n$ wherein the average value of $n$ is about 4.5, butyl thiostannoic anhydride $(CRH_9SnS_{1.5})_n$ wherein the average value of $n$ is about 4.5, and a mixture of butyl stannoic anhydride with butyl thiostannoic anhydride.

The second member of the stabilizer pair is a compound of the formula $R'_2Sn(SR'')_2$. In this formula $R'$ is an alkyl radical containing between 1 and 12 carbon atoms, $R''$ is a radical selected from the same group as $R'$, a benzyl radical or a residue of a carboxylic acid ester derived from acetic or propionic acid and a monohydric alcohol containing between 5 and 16 carbon atoms. Preferred second stabilizers include but are not limited to di-n-butyltin bis(iso-octylmercaptoacetate) and tributyltin lauryl mercaptide. Other preferred second stabilizers include:

dibutyltin bis lauryl mercaptide
dibutyltin bis octyl mercaptide
dibutyltin bis benzyl mercaptide
dimethyltin bis lauryl mercaptide
dibutyltin bis iso-octyl mercaptoacetate
dioctyltin bis iso-octyl mercaptoacetate
dimethyltin bis iso-octyl mercaptoacetate
dibutyltin bis iso-amyl mercaptoacetate
dibutyltin bis stearyl mercaptoacetate
dibutyltin bis dodecyl mercaptopropionate The first and second stabilizers are present in stabilizing amounts. Typically the first stabilizer $(RSnX_{1.5})_n$ is used in amount of 0.1–10 parts by weight of 100 parts by weight of halogen-containing, typically vinyl chloride resin. Preferably it may be used in the amount of 0.25–2, most preferably 0.3 parts per 100 parts of halogen-containing vinyl resin.

Typically the second stabilizer concentration is between about 0.1–10 parts per 100 parts by weight of halogen-containing resin. Preferably the amount used is between 0.05–4 parts per 100 parts of halogen-containing resin. Preferred results are achieved when the second stabilizer is present in amounts at least about twice that of the first stabilizer.

The novel heat and light stable compositions of this invention may be formulated by such techniques as milling, dry blending, Banbury blending, or any other commonly employed formulating techniques.

A particularly convenient formulating method involves the formation of a stabilizer composition containing the first stabilizer and the second stabilizer. This stabilizer composition is subsequently added to, and thoroughly mixed with the vinyl chloride polymer. Where this technique is employed, the stabilizer composition comprises stabilizing amounts of the stabilizers, typically 0.1–10 parts by weight of the first stabilizer and 0.1–10 parts by weight of the second stabilizer. Preferably, it may comprise about 0.3 parts of the first stabilizer and about 1.2 parts of the second stabilizer.

Whatever formulating technique be employed, it will be desirable to substantially completely and uniformly disperse the first stabilizer and the second stabilizer throughout the vinyl chloride polymer composition.

It is a feature of the novel stabilizer systems of this invention that it permits attainment of stabilized halogen-containing polymers and resins, particularly vinyl halide polymers such as poly(vinyl chloride) characterized by their resistance to the deteriorative effect of heat. The degrees of stabilization attained in such systems are considered to be considerably in excess of that previously attainable by any prior art stabilizer system or by either member of the present stabilizer pairs when employed separately.

Because of the outstanding properties of this novel stabilizer system, it is possible to effect stabilization with lower quantities and thereby to obtain a more efficient system on a cost-performance basis.

The novel features of this invention and the unexpected and outstanding results which may be attained by practice of this invention are demonstrated by the following illustrative examples wherein all parts are parts by weight unless otherwise indicated.

In these examples, the rigid vinyl chloride polymer employed was that having a specific gravity of 1.40, a Shore Durometer "D" hardness of 80 and an ultimate tensile strength of about 7,000 p.s.i. ($5.0 \times 10^5$ g./cm.$^2$) sold under the trademark Geon 103 EP.

The stabilized compositions were thoroughly blended by placing the poly(vinyl chloride) together with the noted quantity of first and second stabilizers on a two-roller differential mill which was oil-heated to a temperature and the mixture was milled for about 5 minutes. A continuous band of the composition formed around one of the rollers. This band was cut and the composition removed from the hot roller as a continuous sheet. Squares of this material measuring 2.54 cm. x 2.54 cm. were cut for heat stability testing.

For the heat stability test, the squares were placed in an air oven regulated to maintain a temperature of 190° C. Samples of each composition were removed from the oven at 15 minute intervals and were rated visually as to color change and degradation according to the following scale:

7—clear, water-white
6—off-white
5—slightest degree of yellowing
4—definite yellow color
3—deep yellow-brown color
2—deep brown color
1—dark brown to black color The length of time in minutes required to reach a value of 3 or less was recovered as the heat stability value.

Table I summarizes the stabilizers evaluated, the color of the resin composition following milling and the heat stability value for each of the compositions tested.

The heat stability values demonstrate the superior stabilization obtained using the combinations of this invention. The present stabilizers are considered to be synergistic, as is evident from the data of Example 12 wherein a portion of a moderately effective stabilizer, e.g. dibutyltin bis (iso-octylmercaptoacetate), is replaced by a relatively poor stabilizer, polymeric butyl thiostannoic anhydride. The resultant resin composition exhibits a heat stability value superior to that obtained using either stabilizer component alone.

TABLE I

| Example No. | Stabilizer A | Stabilizer B | Resin color after milling | Heat stability value (min.) |
|---|---|---|---|---|
| 1 | None | None | 1 | 0 |
| 2 | Butyl thiostannoic anhydride (avg. n=4.5) (1.5)[1] | do | 7 | 60 |
| 3 | Methyl thiostannoic anhydride (avg. n=4.5) (1.5) | do | 6 | 60 |
| 4 | Mixed butyl stannoic and butyl thiostannoic anhydrides (2:1 ratio) (1.5 parts) | do | 7 | 60 |
| 5 | None | Dibutyltin bis(iso-amyl mercapto acetate) (1.5) | 7 | 60 |
| 6 | do | Dibutyltin bis(iso-octyl mercapto acetate) (1.5) | 7 | 60 |
| 7 | do | Dibutyltin bis (dodecyl mercapto acetate) 1.5) | 7 | 60 |
| 8 | do | Dibutyltin bis (stearyl mercapto acetate (1.5) | 7 | 60 |
| 9 | do | Dibutyltin bis (dodecyl mercapto propionate) (1.5) | 7 | 60 |
| 10 | do | Dioctyltin bis (iso-octyl mercapto acetate) (1.5) | 7 | 60 |
| 11 | do | Dioctyltin bis (stearyl mercapto acetate) (1.5) | 7 | 45 |
| 12 | do | Dimethyltin bis (iso-octyl mercapto acetate) (1.5) | 7 | 60 |
| 13 | do | Dibutyltin bis (iso-octyl thiomaleate)[2] (1.5) | 7 | 45 |
| 14 | do | Dibutyltin bis (octyl mercaptide) (1.5) | 7 | 60 |
| 15 | do | Dibutyltin bis (lauryl mercaptide) (1.5) | 7 | 60 |
| 16 | do | Dibutyltin bis (benzyl mercaptide) (1.5) | 7 | 75 |
| 17 | do | Dimethyltin bis (lauryl mercaptide) (1.5) | 7 | 60 |
| 18 | Ex. 2 (0.3) | Ex. 5 (1.2) | 7 | 90 |
| 19 | Ex. 2 (0.3) | Ex. 6 (1.2) | 7 | 75 |
| 20 | Ex. 2 (0.3) | Ex. 7 (1.2) | 7 | 90 |
| 21 | Ex. 2 (0.3) | Ex. 8 (1.2) | 7 | 75 |
| 22 | Ex. 2 (0.3) | Ex. 9 (1.2) | 7 | 75 |
| 23 | Ex. 2 (0.3) | Ex. 10 (1.2) | 7 | 75 |
| 24 | Ex. 2 (0.3) | Ex. 11 (1.2) | 7 | 90 |
| 25 | Ex. 2 (0.3) | Ex. 12 (1.2) | 7 | 90 |
| 26 | Ex. 2 (0.3) | Ex. 13 (1.2) | 7 | 75 |
| 27 | Ex. 2 (0.3) | Ex. 14 (1.2) | 7 | 90 |
| 28 | Ex. 2 (0.3) | Ex. 15 (1.2) | 7 | 75 |
| 29 | Ex. 2 (0.3) | Ex. 16 (1.2) | 7 | 90 |
| 30 | Ex. 2 (0.3) | Ex. 17 (1.2) | 7 | 75 |
| 31 | Ex. 2 (0.1) | Ex. 6 (1.4) | 7 | 75 |
| 32 | Ex. 2 (0.75) | Ex. 6 (0.75) | 7 | 90 |
| 33 | Ex. 3 (0.3) | Ex. 6 (1.2) | 7 | 90 |
| 34 | Ex. 3 (0.3) | Ex. 17 (1.2) | 7 | 75 |
| 35 | Ex. 4 (0.3) | Ex. 6 (1.0) | 7 | 75 |

[1] Numbers in parentheses refer to parts by weight per 100 parts of poly(vinyl chloride) resin.
[2] See the following:

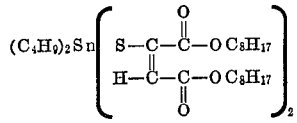

Although this invention has been illustrated by reference to specific examples, changes therein which clearly fall within the scope of the invention will be apparent to those skilled in the art. It is, therefore, to be limited solely by the scope of the appended claims.

What we claim is:

1. A novel, improved halogen-containing vinyl resin composition stabilized against the deteriorative effect of heat, comprising a halogen-containing resin selected from the group consisting of poly(vinyl chloride), poly(vinylidene chloride) and copolymers of vinyl chloride or vinylidene chloride with one or more ethylenically unsaturated monomers and (1) between 0.1 and 10%, based on the weight of said halogen-containing resin, of a first stabilizer of the formula $(RSnX_{1.5})_n$ wherein R is a monovalent alkyl hydrocarbon radical containing between 1 and 4 carbon atoms, inclusive, X is sulfur or a mixture of between 1 and 10 parts of sulfur with between 10 and 1 part of oxygen and $n$ is an integer between about 1 and 5, inclusive, and (2) between 0.1 and 10%, based on the weight of said halogen-containing resin, of a second stabilizer of the formula $R_2'Sn(SR'')_2$ wherein R' is a monovalent alkyl hydrocarbon radical containing between 1 and 12 carbon atoms, inclusive, and R'' is a radical selected from the group consisting of

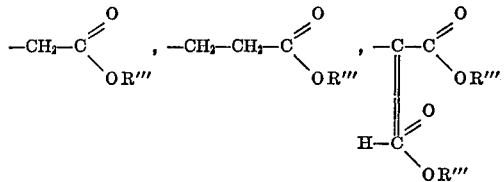

a benzyl radical and radicals selected from the same group as R', wherein R''' represents an alkyl radical containing not less than 5 nor more than 16 carbon atoms with the proviso that the weight ratio of first to second stabilizer is between 1:1 and 1:4, respectively.

2. The novel resin composition of claim 1 wherein said first stabilizer is selected from the group consisting of polymeric butyl thiostannoic anhydride, polymeric methyl thiotannoic anhydride and a chemically combined mixture of butylstannoic anhydride and butyl thiostannoic anhydride, and said second stabilizer is selected from the group consisting of dibutyltin bis(iso-amyl mercapto acetate), dibutyltin bis(iso-octyl mercapto acetate), dibutyltin bis(dodecyl mercapto acetate), dibutyltin bis(stearyl mercapto acetate), dibutyltin bis(dodecyl mercapto propionate), dioctyltin bis(iso-octyl mercapto acetate), dioctyltin bis(stearyl mercapto acetate), dimethyltin bis(iso-octyl mercapto acetate), dibutyltin bis(octyl mercaptide), dibutyltin bis(lauryl mercaptide), dibutyltin bis(benzyl mercaptide) and dimethyltin bis(lauryl mercaptide).

3. The novel resin composition of claim 1 wherein said second stabilizer is present in an amount not less than about twice that of said first stabilizer.

4. A novel, improved stabilizer composition for stabilizing a halogen-containing resin selected from the group consisting of poly(vinyl chloride), poly(vinylidene chloride), and copolymers of vinyl chloride or vinylidene chloride with one or more ethylenically unsaturated monomers, said stabilizer composition comprising (1) a first stabilizer of the formula $(RSnX_{1.5})_n$ wherein R is a monovalent alkyl hydrocarbon radical containing between 1 and 4 carbon atoms, inclusive, X is sulfur or a mixture of between 1 and 10 parts of sulfur with between 10 and 1 part of oxygen and $n$ is an integer between about 1 and 5, inclusive, and (2) a second stabilizer of the formula $R_2'Sn(SR'')_2$ wherein R' is a monovalent alkyl hydrocarbon radical containing between 1 and 12 carbon atoms, inclusive, and R'' is a radical selected from the group consisting of

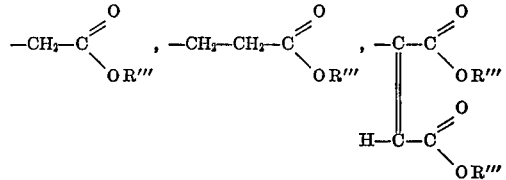

a benzyl radical and radicals selected from the same group as R', wherein R''' represents an alkyl radical containing not less than 5 nor more than 16 carbon atoms with the proviso that the weight ratio of first to second stabilizer is between 1:1 and 1:4, respectively.

5. The novel stabilizer composition of claim 4 wherein said first stabilizer is selected from the group consisting of polymeric butyl thiostannoic anhydride, polymeric methyl thiostannoic anhydride and a chemically combined mixture of butyl stannoic anhydride and butyl thiostannoic anhydride, and said second stabilizer is selected from the group consisting of dibutyltin bis(iso-amyl mercapto acetate), dibutyltin bis(iso-octyl mercapto acetate), dibutyltin bis(dodecyl mercapto acetate), dibutyltin bis(stearyl mercapto acetate), dibutyltin bis(dodecyl mercapto propionate), dioctyltin bis(iso-octyl mercapto acetate), dioctyltin bis(stearyl mercapto acetate), dimethyltin bis(iso-octyl mercapto acetate), dibutyltin bis(octyl mercaptide), dibutyltin bis(lauryl mercaptide), dibutyltin bis(benzyl mercaptide) and dimethyltin bis(lauryl mercaptide).

6. The novel stabilizer composition of claim 4 wherein said second stabilizer is present in an amount not less than about twice that of said first stabilizer.

References Cited
UNITED STATES PATENTS

| | | | |
|---|---|---|---|
| 3,424,717 | 1/1969 | Gottlieb et al. | 260—45.75 |
| 3,640,950 | 2/1972 | Weisfield | 260—45.75 |

DONALD E. CZAJA, Primary Examiner

V. P. HOKE, Assistant Examiner

U.S. Cl. X.R.

252—406